US009059613B2

(12) United States Patent
Rigosu, Jr. et al.

(10) Patent No.: US 9,059,613 B2
(45) Date of Patent: Jun. 16, 2015

(54) AMORTISSEUR ASSEMBLY FOR A ROTOR, AND A METHOD OF FORMING AN AMORTISSEUR ASSEMBLY

(75) Inventors: Vincent Rigosu, Jr., Schenectady, NY (US); Michael Bresney, Altamont, NY (US); Kurt Carlone, Schenectady, NY (US)

(73) Assignee: AGT Services, Inc., Amsterdam, NY (US)

( * ) Notice: Subject to any disclaimer, the term of this patent is extended or adjusted under 35 U.S.C. 154(b) by 615 days.

(21) Appl. No.: 13/404,856

(22) Filed: Feb. 24, 2012

(65) Prior Publication Data
US 2013/0221797 A1 Aug. 29, 2013

(51) Int. Cl.
| *H02K 9/00* | (2006.01) |
| *H02K 9/06* | (2006.01) |
| *H02K 47/00* | (2006.01) |
| *H02K 3/48* | (2006.01) |
| *H02K 3/16* | (2006.01) |
| *H02K 3/24* | (2006.01) |

(52) U.S. Cl.
CPC ............. *H02K 3/16* (2013.01); *Y10T 29/49012* (2015.01); *H02K 3/24* (2013.01)

(58) Field of Classification Search
CPC ............ H02K 3/46; H02K 3/50; H02K 55/04
USPC ............. 310/58, 61, 113, 120, 125, 132, 214, 310/216.114, 262, 411
See application file for complete search history.

(56) References Cited

U.S. PATENT DOCUMENTS

| 2,712,085 | A | * | 6/1955 | Willyoung ............... 310/262 |
| 3,139,550 | A | | 6/1964 | Greer |
| 3,909,931 | A | | 10/1975 | Lambrecth |
| 4,363,986 | A | | 12/1982 | Joho et al. |
| 4,739,207 | A | | 4/1988 | Ying et al. |
| 5,090,114 | A | | 2/1992 | Walker et al. |
| 5,122,698 | A | | 6/1992 | Walker et al. |
| 5,550,417 | A | | 8/1996 | Morrison et al. |
| 5,606,211 | A | | 2/1997 | Morrison et al. |
| 5,929,550 | A | | 7/1999 | Kaminski et al. |
| 6,218,756 | B1 | | 4/2001 | Gardner et al. |
| 6,252,328 | B1 | | 6/2001 | Brem et al. |
| 6,864,617 | B1 | * | 3/2005 | Wang et al. ............... 310/270 |
| 6,984,912 | B2 | | 1/2006 | Gomes De Lima et al. |
| 2008/0252156 | A1 | | 10/2008 | Kabata et al. |

FOREIGN PATENT DOCUMENTS

| JP | 56006657 A | * | 1/1981 |
| JP | 05064416 A | * | 3/1993 |

* cited by examiner

*Primary Examiner* — Jose Gonzalez Quinone
(74) *Attorney, Agent, or Firm* — Burr & Brown, PLLC

(57) ABSTRACT

An amortisseur assembly comprises an end winding amortisseur. The end winding amortisseur comprises a body, at least one finger element, and a stop block. The body comprises a first edge. The finger element extends from the first edge of the body, and comprises a first surface. The stop block can attached to the first surface. The amortisseur assembly can further comprise a slot amortisseur so that the stop block abuts an end of the slot amortisseur. The amortisseur assembly can be assembled on a radial-flow cooled rotor. A method of forming an amortisseur assembly for a rotor comprises providing one or more slot amortisseurs and one or more of the end winding amortisseurs. The slot amortisseurs can be provided by shortening existing slot amortisseurs. The slot springs can replace existing slot springs, and the one or more slot springs can be longer than the existing slot springs.

20 Claims, 4 Drawing Sheets

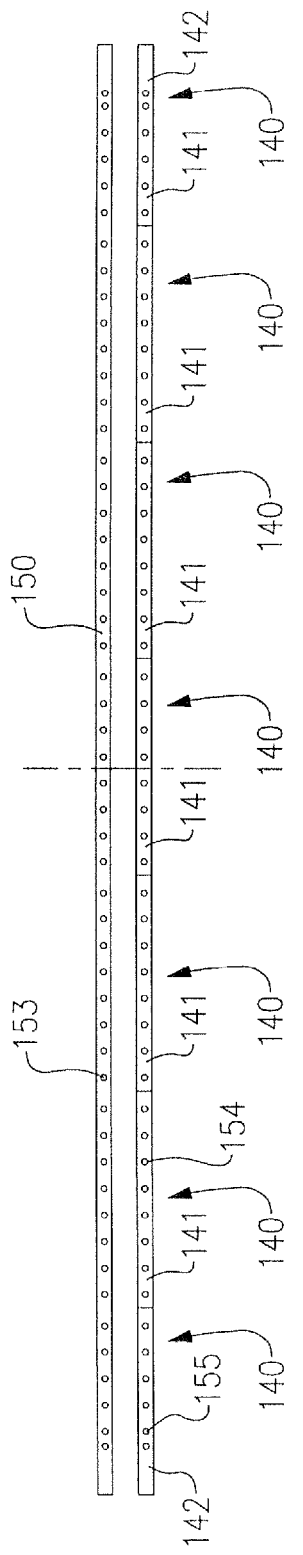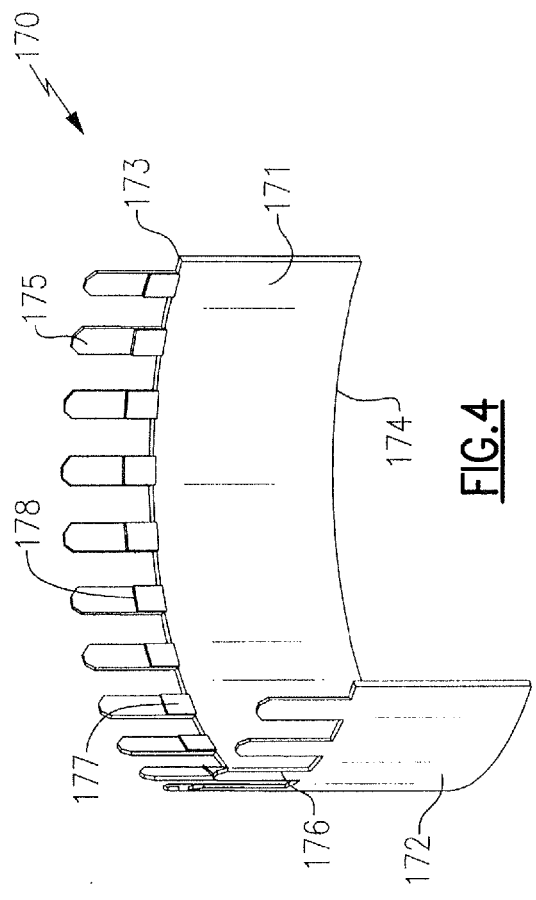

AMORTISSEUR ASSEMBLY FOR A ROTOR, AND A METHOD OF FORMING AN AMORTISSEUR ASSEMBLY

FIELD OF THE INVENTION

This invention relates generally to an amortisseur assembly for a rotor, and more particularly, to an amortisseur assembly and a method of making and installing an amortisseur assembly that reduces or prevents migration of radial venting holes out of alignment in a rotor.

BACKGROUND OF THE INVENTION

Undesirable or excessive heat can occur in an electrical machine, such as a generator, and in particular, in the rotor of a generator. Undesirable heat can cause the rotor and the generator to run less efficiently, and in cases of more severe heat buildup, the excessive heat can cause damage to the rotor components or other parts of the generator.

One method to cool a rotor comprises radial flow cooling. With radial flow cooling, a cooling fluid can flow through one or more rotor subslots, each of which can be a path extending longitudinally through an internal portion of the rotor. The cooling fluid can flow longitudinally through the rotor subslot and then branch, venting radially out of the rotor via radial vent paths defined, at least in part, by holes through the body of the rotor, as well as holes through other rotor components (e.g., components attached to the rotor).

Rotor components that define vent holes can comprise a rotor body, rotor windings, creepage blocks, amortisseurs (otherwise referred to as amortisseur windings and amortisseur bars, amongst other names known by those skilled in the art), slot springs, and slot wedges, each of which can be positioned in a longitudinally-extending rotor slot which is in the periphery of the rotor body.

A plurality of the rotor slots can be spaced around the circumference of the rotor, with rotor teeth between the rotor slots. Rotor windings, or coils, which can be made up of a number of copper turns separated by insulation, can be set in the coil slots. The rotor windings, as well as the other rotor components in the rotor slots, can be held from moving radially outward by the slot wedges. The slot wedges can be inserted serially in the rotor slots radially outside the rotor windings and, in turn, retained radially by a dovetail-shaped structure of the rotor slots. The creepage blocks can be interposed between the slot wedges and the rotor windings, and the creepage blocks can serve as insulating barriers between the slot wedges and the rotor windings.

One or more types of amortisseurs can serve to conduct electrical energy between major rotor components and, in doing so, decrease or prevent an axially flowing current loop. Like that of radial flow cooling, one effect of amortisseurs is to reduce heat, increasing generator efficiency and decreasing the risk of damage to the generator. In some generators, such as static start generators, which can be used as synchronous motors to start gas-turbines, magnetically induced subsynchronous torques occur on the generator and turbine rotors. Magnetic fields are produced in the generator rotor body as a result of subsynchronous current flow, which produces eddy currents. The torques can occur at frequencies near turbine and generator rotor resonant frequencies, which can detrimentally affect the physical integrity of the generator components. The eddy currents cause the components conducting them to undesirably heat. The amortisseurs have a relatively low resistance as compared to other components of the rotor, so the amortisseurs can carry the electrical energy away from the rotor and the other rotor components with minimal heat generation caused by electrical resistance. Carrying the electrical energy between major rotor components also reduces the effects of the magnetically induced subsynchronous torques.

An end winding amortisseur can be placed on each end of the rotor, under a retaining ring, which the end winding amortisseur serves to protect from overheating. The end winding amortissuer can be a ring, or can be segmented portions that form a ring around the end of the rotor. In some instances, the end winding amortissuer has finger elements that extend into the rotor slots and overlap and mate with slot amortisseurs to make electrical contact with the slot amortisseurs.

Slot amortisseurs can be arranged in the rotor slots under the slot wedges. The slot amortisseurs can conduct electrical energy that might otherwise flow axially through and heat up the slot wedges, rotor teeth, and/or other components. To maintain solid contact with the slot wedges, slot springs can be arranged under each slot amortisseur to exert and maintain a radial force on each slot amortissuer and press each slot amortissuer radially outward against the slot wedges. The slot springs can be leaf springs or other types of springs.

In order to facilitate the radial flow cooling, each slot wedge, slot amortisseur, and slot spring, when used, has one or more vent hole so that over a length of a rotor slot, a plurality of vent holes can be spaced. The vent holes in the slot wedges, the slot amortissuers, and the slot springs are aligned with vent holes through the rotor windings and the creepage blocks to form radial vent paths.

The slot wedges are packed into the coil slots tightly with the slot amortissuers and/or the slot springs. This tight fit is intended to maintain the alignment of the rotor components, including the alignment of the vent holes to maintain a clear vent path and facilitate efficient cooling and operation of the rotor. Unfortunately, the friction between the slot springs (when used), the slot amortisseurs, and the slot wedges, created by the tight radial fit of these rotor components, does not suffice to retain the components, and the alignment of the vent holes. High rotations per minute, high accelerations, and vibrations of the rotor, as well as other causes, can cause migration of the slot amortisseurs and/or the slot springs in either longitudinal direction, thereby causing blockage of the radial vent paths, which in turn, can cause overheating, physical imbalance, and problems associated with overheating and imbalance.

It would be advantageous to reduce or eliminate migration of the slot amortisseurs and/or the slot springs in order to reduce or prevent migration of the rotor components and misalignment of the vent holes, and thereby reduce or prevent the associated problems described herein above.

SUMMARY OF THE INVENTION

In one embodiment of the invention, an amortisseur assembly can comprise at least one end winding amortisseur, wherein each end winding amortisseur comprises an annular body, at least one finger element, and a stop block. The annular body can comprise a first edge. The at least one finger element can extend from the first edge, with each finger element having a first surface facing radially inwardly with respect to the annular body. The stop block can be attached to the first surface of at least one of the at least one finger element. The amortisseur assembly can further comprise at least one slot amortisseur, wherein each finger element extends over a respective one of the slot amortisseurs, and each stop block abuts an end of a respective one of the slot amortisseurs.

In another embodiment, a rotor assembly can comprise a rotor. The rotor can comprise a rotor body first end, a rotor body second end, and at least one rotor slot extending longitudinally across at least a portion of the rotor body between the rotor body first end and the rotor body second end. The at least one annular end winding amortisseur can be positioned on at least one of the rotor body first end and the rotor body second end. The at least one slot amortisseur can be positioned in the at least one rotor slot. The end winding amortisseur can comprise a first edge with at least one finger element extending from the edge, each finger element extending over and mating with a respective one of the slot amortisseurs, at least one of the finger elements comprising a stop block, each stop block abutting an end of a respective one of the slot amortisseurs.

In another embodiment, a method of forming an amortisseur assembly for a rotor can comprise providing one or more slot amortisseurs, and providing one or more end winding amortisseurs. The end winding amortisseurs can each comprise an annular body with a first edge and at least one finger element extending from the first edge of the annular body, each finger element comprising a first surface facing radially inwardly with respect to the annular body, and a stop block attached to the first surface of at least one of the at least one finger element. The method can further comprise providing one or more slot springs. The method can further comprise installing the at least one slot spring into a rotor slot. The slot amortisseurs can be provided by shortening existing slot amortisseurs symmetrically on each end by a length of the stop block, and the slot springs can be provided by replacing existing slot springs with longer slot springs.

BRIEF DESCRIPTION OF THE DRAWINGS

FIG. 3 illustrates a slot amortisseur and a slot spring, according to one exemplary embodiment.

FIG. 4 illustrates an end winding amortisseur, according to one embodiment.

DETAILED DESCRIPTION OF THE INVENTION

Figure 1:
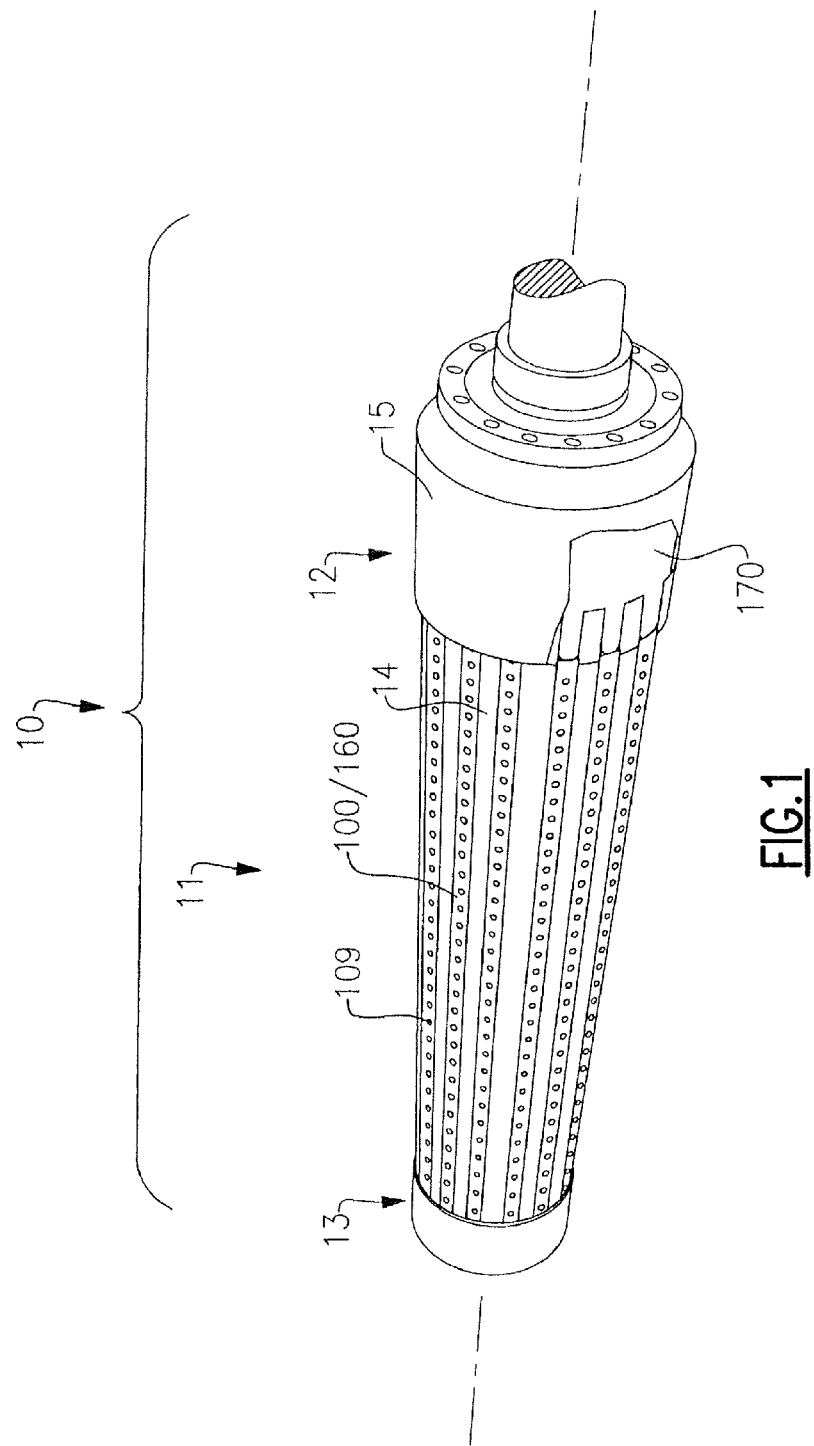
FIG. 1 is a partially assembled perspective view of a rotor, according to one embodiment.

FIG. 1 is a partially assembled perspective view of a rotor 10, according to one embodiment that uses radial flow cooling. In this exemplary embodiment, the rotor 10 comprises a rotor body 11, and the rotor body 11 comprises a rotor body first end 12 and a rotor body second end 13. Rotor slots 100 extend longitudinally between the rotor body first end 12 and the rotor body second end 13, at a depth in the periphery of the rotor body 11. In FIG. 1, slot wedges 160 are shown in most of the length of each rotor slot 100, with vent holes opening to radial vent paths 109. Between the rotor slots 100 are rotor teeth 14. On each rotor end 12, 13, a retaining ring 15 encloses an end winding amortisseur 170. In FIG. 1, the retaining ring 15 is shown partially cut away to reveal the end winding amortisseur 170.

Figure 2:
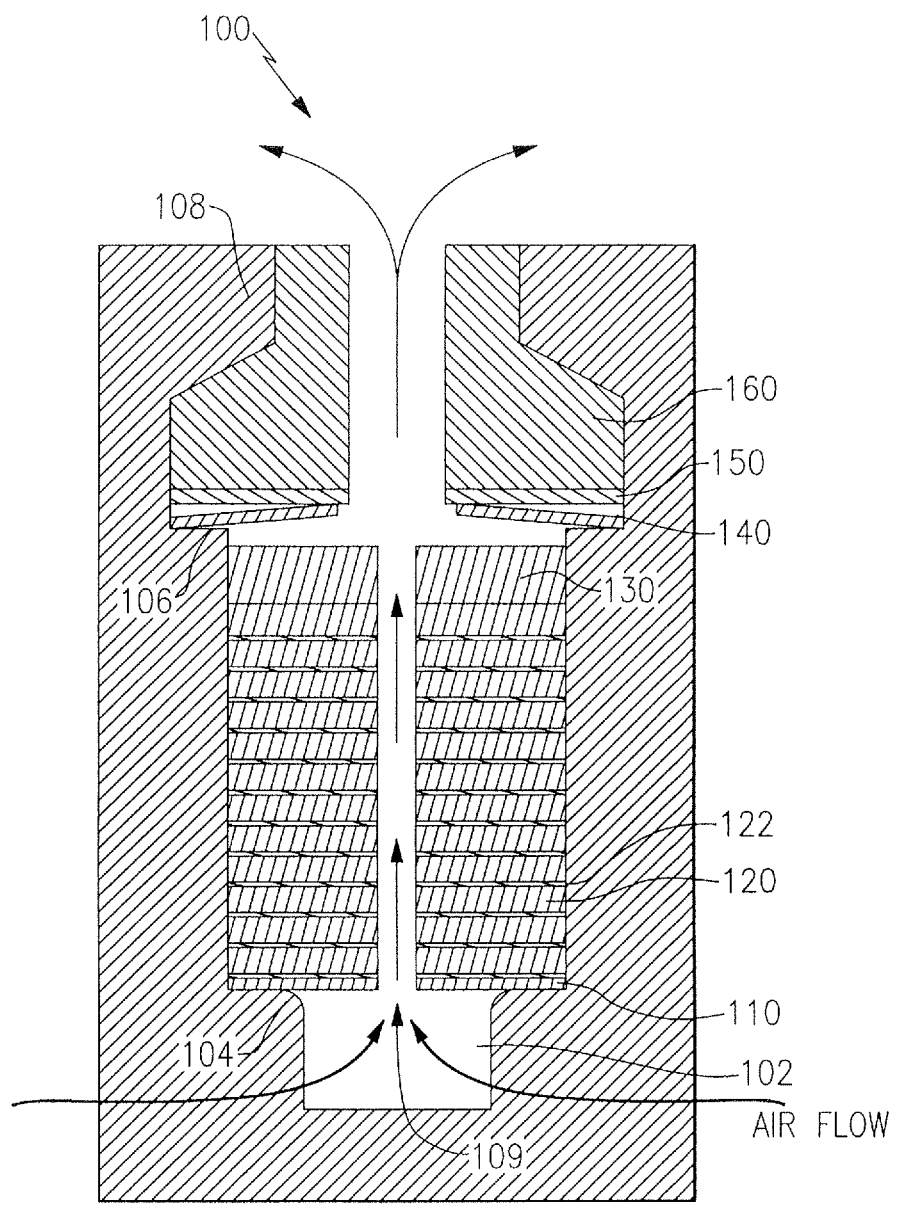
FIG. 2 is a sectional view of a rotor slot with rotor components in the rotor slot, according to one embodiment.

FIG. 2 is a view of a rotor slot 100 with rotor components in the rotor slot, sectioned through a vent hole, according to one embodiment of a rotor 10 that uses radial flow cooling. In this embodiment, a rotor subslot 102 is at the bottom (e.g., the most radially inward end) of the rotor slot 100. The rotor slot 100 has an inner shoulder 104 upon which a subslot cover 110 and a rotor winding 120, having turns of copper separated by insulation 122, are radially stacked. A creepage block 130 is positioned in the rotor slot 100 radially outward from the rotor winding 120. The rotor slot 100 has an outer shoulder 106 upon which a slot spring 140 is stacked with a slot amortisseur 150 and a slot wedge 160, in that order. The slot wedge 160 is wedged between the slot amortisseur 150 and a dove-tailed portion 108 of the rotor slot 100. Each of these rotor components has at least one vent hole radially aligned with vent holes from the other stacked rotor components to form a radial vent path 109. Cooling fluid flows longitudinally through the subslot 102 and exits the rotor 10 through one or more radial vent paths 109 in one or more rotor slots 100.

FIG. 3 illustrates the slot amortisseur 150 and a plurality of slot springs 140, according to one exemplary embodiment of the invention. The length of the slot amortisseur 150 and the cumulative length of the slot springs 140 in a rotor slot 100 is less than the length of the rotor slot 100 by a set amount. According to the illustrated embodiment, the slot amortisseur 150 is 162.000 inches (≈411.48 centimeters) long. Five middle springs 141 are each 24.000 inches (≈60.96 centimeters) long and two end springs 142 are each 20.969 inches (≈53.261 centimeters) long. The total length of the five middle springs 141 plus the two end springs 142 laid end to end in the rotor slot 100 is 161.938 inches (≈411.323 centimeters). The end springs 142 can alternatively be dimensioned at 21.000 inches even (≈53.34 centimeters) so that the cumulative length of the springs 141, 142 will equal the length of the slot amortisseur 150. However, manufacturing the springs 141, 142 so the cumulative length of all the slot springs 141, 142 serially lined in a rotor slot 100 theoretically will be less than the length of the slot amortisseur 150, can accommodate manufacturing tolerances and/or irregularities that can stack with the addition of each separate spring 141, 142 and might otherwise make the slot springs 141, 142 too long to fit in the rotor slot 100.

A different number and length of the springs 141, 142 can also be used. Any number of middle springs 141 can be used and any length of the springs 141, 142 can be used that cumulatively adds to, or approximately adds to, the length of the slot amortisseur 150. Using less middle springs 141 with a greater length of the springs 141, 142 can increase the friction and tension of the springs 141, 142 to facilitate the function of the springs 141, 142 in applying constant force radially outward against the slot amortisseur 150, and in reducing migration of the springs 141, 142 and/or the slot amortisseur 150. Further, using less middle springs 141 with a greater cumulative length of the springs 141, 142 in a rotor slot 100 minimizes the stacking effect of manufacturing tolerances and irregularities, thereby facilitating more precise lengths. The cumulative length of the slot springs 141, 142 is driven, in part, by the length of the rotor slot 100.

The slot amortisseur 150 can also be a different length, depending in part on the length of the rotor slot 100, as well as the sizes of other rotor components, as will be further described below.

The slot amortisseur 150 can be flat while the slot springs 141, 142 can be leaf springs with a radius from side to side. The radius can provide the springing action. Other types of slot springs 140 can also be used in some embodiments, while in yet other embodiments, slot springs 140 can be absent.

In the illustrated embodiment, amortisseur vent holes 153 are spaced evenly across the length of the slot amortisseur 150 at 3.000 inches (≈7.62 centimeters). The amortisseur vent holes 153 are positioned symmetrically on each side of the center of the slot amortisseur 150. The amortisseur vent holes 153 are 0.625 inches (≈1.588 centimeters) in diameter. However, the amortisseur vent holes 153 can be alternatively sized. On each end of the slot amortisseur 150, an end amortisseur vent hole 153 is spaced 1.500 inches (≈3.81 centimeters) from the adjacent amortisseur vent hole 153.

In the illustrated embodiment, the middle springs 141 each comprise middle spring vent holes 154 that mirror the size and spacing of the amortisseur vent holes 153. Additionally, when the middle springs 141 are arranged serially and centered with the slot amortisseur 150, the middle spring vent holes 154 mirror the symmetry and position of the amortisseur vent holes 153.

Likewise, in the illustrated embodiment, the end springs 142 each comprise end spring vent holes 155 that mirror the size and spacing of the amortisseur vent holes 153. When the end springs are arranged on the ends of the serially arranged middle springs 141, which are centered with the slot amortisseur 150, the end spring vent holes 155 mirror the symmetry and position of the amortisseur vent holes 153, including the spacing, position, and symmetry of the two end vent holes.

FIG. 4 illustrates a segment of an end winding amortisseur 170, according to one embodiment of the invention. The segment is half of the full end winding amortisseur 170. The end winding amortisseur 170 has a radially inner side 171, a radially outer side 172, a longitudinally inner end 173 and a longitudinally outer end 174. Finger elements 175 extend from the longitudinally inner end 173. The finger elements 175 can be regularly spaced around the circumference of the longitudinally inner end 173 to match the spacing of the rotor slots 100. The quantity of finger elements 175 can correspond to the number of rotor slots 100, with each finger element 175 corresponding to one end of one rotor slot 100. It is also conceived that each end winding amortisseur 170 can have any number of finger elements 175.

Each finger element 175 has a finger base 176, and at least some of the finger elements 175 have a stop block 177 on the radially inner side of the finger base 176. The stop block 177 can be an integral portion of the finger element 175, or the stop block 177 can be attached to the finger element 175 by welding, gluing, or other known attachment means. The stop block 177 can have a longitudinally innermost edge 178 that is straight and substantially parallel with the longitudinally inner end 173 of the end winding amortisseur 170 and/or substantially perpendicular to the longitude of the rotor slot 100. The quantity of finger elements 175 with stop blocks 177 can be determined by the number of rotor slots 100, with one finger element 175 and one stop block 177 at each end of one rotor slot 100. It is also conceived that it might be desirable to use finger elements 175 and/or stop blocks 177 with any desirable number of rotor slots, or at only one end of any particular rotor slot 100.

In the illustrated embodiment, the finger elements 175 extend 4.937 inches (≈12.540 centimeters) from the longitudinally inner end 173 of the end winding amortisseur 170. In other embodiments, the length of the finger elements 175 can vary. The finger elements 175 are long enough to extend into the rotor slots 100 and overlap the slot amortisseurs 150.

The stop blocks 177 extend 1.500 inches (≈3.81 centimeters) from the longitudinally inner end 173 of the end winding amortisseur 170. This 1.500 inches (≈3.81 centimeters) is equal or approximately equal to the distance by which the slot amortisseurs 150 and the slot springs 141, 142 are short from the end of the rotor slots 100 and/or the longitudinally inner end 173 of the end winding amortisseur 170, when assembled into the rotor slots 100. The length of the stop blocks 177 can vary in other embodiments according to the length of the slot amortisseurs 150 and/or the slot springs 141, 142 so that the stop blocks 177 are equal or approximately equal to the distance by which the slot amortisseurs 150 and/or the slot springs 140 are short from the end of the rotor slots 100 and/or the longitudinally inner end 173 of the end winding amortisseur 170.

The stop block 177 can have a thickness so that the stop block 177 can abut against the end of the slot amortisseur 150 and/or the end of the slot spring 142. In some embodiments, such as if slot springs 141, 142 are not used, the thickness is no greater than the thickness of the slot amortisseurs 150. In some embodiments when slot springs 141, 142 are used, the thickness is greater than the thickness of the slot amortisseurs 150 and less than the combined thickness of the slot amortisseurs 150 and the slot springs 141, 142, when the slot springs 141, 142 are compressed. Accordingly, the thickness of the stop block 177 can vary in various embodiments in relation to the thickness of the slot amortisseurs 150 and/or the slot springs 141, 142. In the illustrated embodiment, the stop blocks 177 range from 0.143-0.148 inches (0.363-0.376 centimeters).

The tolerances on all the dimensions can be minimal, within 0.010 inches (≈0.025 centimeters). In some cases, the tolerances are within 0.005 inches (≈0.013 centimeters), and in some cases the tolerances are even smaller, within 0.001 inches (≈0.0025 centimeters) or less. Smaller tolerancing, and/or more precise dimensioning can result in a more precise fit of the rotor components serially lined in a rotor slot 100, which can facilitate the reduction and/or prevention of migration of the slot springs 141, 142 and the slot amortisseurs 150 in the rotor slots 100.

Figure 5:
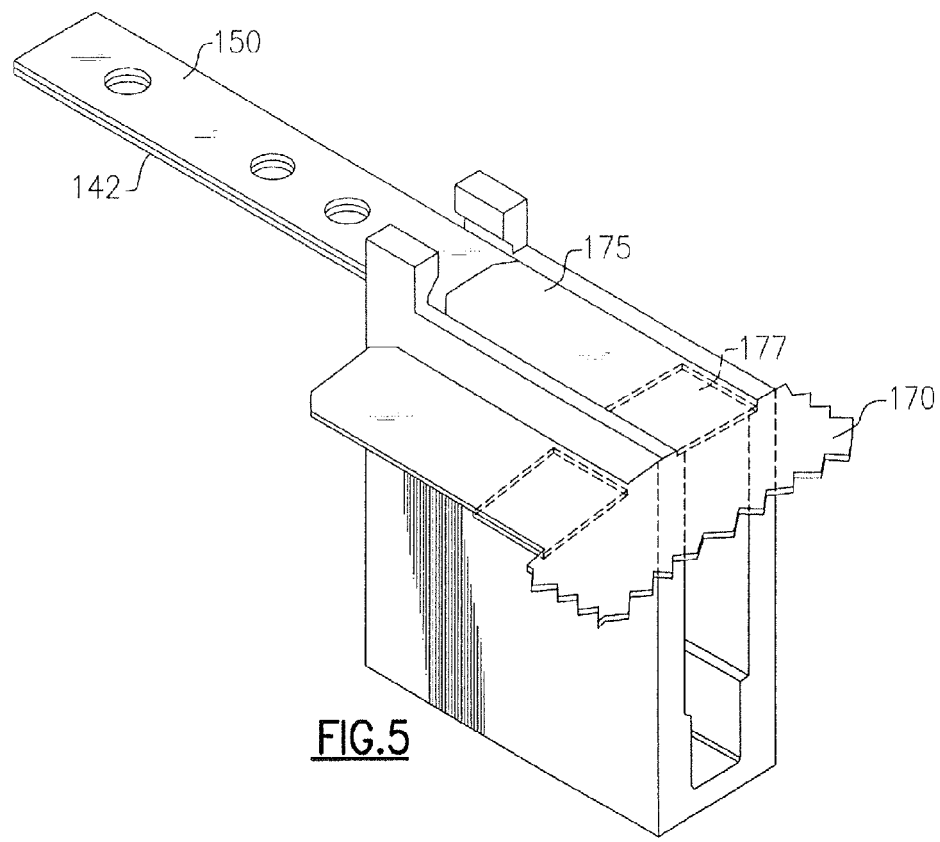
FIG. 5 is a cut-away view of an amortisseur assembly and rotor slot, according to the embodiments illustrated in FIGS. 1, 2, 3, and 4.

FIG. 5 is a perspective cut-away view of an amortisseur assembly and rotor slot, according to the embodiments illustrated in FIGS. 2, 3, and 4. The amortisseur assembly can comprise one or more of the end winding amortisseurs 170 and/or one or more of the slot amortisseurs 150 and/or one or more of the slot springs 141, 142. In the embodiment depicted in FIG. 5, the amortisseur assembly comprises at least one end winding amortisseur 170, at least one slot amortisseur 150, and at least one slot spring 142. In FIG. 5, only end portions of the rotor slot 100 and the slot amortisseur 150 are shown. Further, only a portion of the end winding amortisseur 170 is shown, and the illustrated portion of the end winding amortisseur 170 is shown as transparent so that the stop block and the slot amortisseur 150 can be seen where they would otherwise be hidden under the end winding amortisseur 170.

In the illustrated embodiment, the slot amortisseur 150 and the end slot spring 142 extend a length short of the end of the rotor slot 100, leaving a gap therebetween. In the illustrated embodiment, the gap is approximately 1.500 inches (≈3.81 centimeters). The longitudinally inner end 173 of the end winding amortisseur 170 abuts the rotor teeth 14 and the end of the rotor slot 100. The finger elements 175 of the end winding amortisseur 170 extend into the rotor slot 100 above (e.g. radially outward from) the slot amortisseur 150, overlapping and making physical contact with the slot amortisseur 150. The stop block 177 protrudes downward (e.g. radially inward from) the radially inner side 171 of the finger element 175 of the end winding amortisseur 170, filling the gap defined between the slot amortisseur 150 and the longitudinally inner end 173 of the end winding amortisseur 170. The stop block 177 also extends across the gap defined between the end slot spring 142 and the longitudinally inner end 173 of the end winding amortisseur 170. The length-to-length fit of the slot amortisseur 150 and the slot springs 141, 142, between the two opposing end winding amortisseurs 170, including the stop blocks 177 can be tight, even with some interference to compress the parts in longitudinal alignment. Reducing the spacing and play between the slot springs 141, 142 and the stop blocks 177, and between the slot amortisseur 150 and the stop blocks 177, reduces the opportunity for the slot amortisseur 150 and the slot springs 141, 142 to move out of place and cause the vent holes to become unaligned. There can be some interference fit, or there can be low tolerance for spacing between slot springs 141, 142 and the stop blocks 177, and between the slot amortisseur 150 and the stop blocks 177. For example, the total spacing in the rotor slot 100 between the slot springs 141, 142 and the stop blocks 177 can be less than 0.050 inches (≈0.127 centimeters), and in some cases less than 0.035 inches (≈0.089 centimeters), and in some cases less than 0.010 inches (≈0.025 centimeters), and in some cases 0 inches. The total spacing between the slot amortisseur 150 and the stop blocks 177 can be less than 0.010 inches (≈0.025 centimeters), and in some cases less than 0.005 inches (≈0.013 centimeters), and in some cases 0 inches. Generally, the lesser the total free space in the rotor slot 100 between the slot amortisseur 150 and the stop blocks 177, and/or between the slot springs, 141, 142 and the stop blocks 177, the greater the reduction and/or prevention of misalignment of the vent holes.

Figure 6:
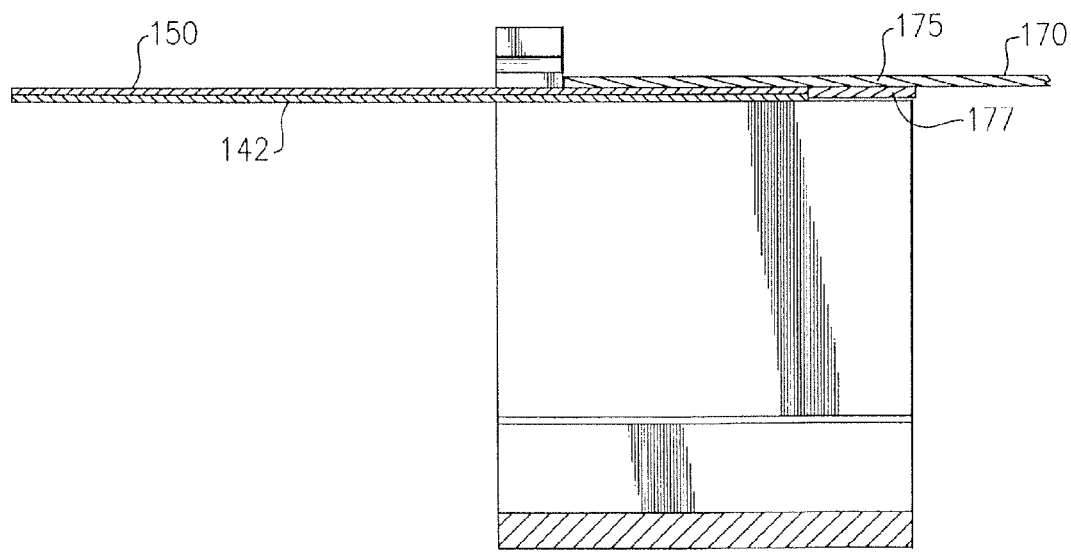
FIG. 6 illustrates a cross section of the amortisseur assembly and rotor slot of FIG. 5.

FIG. 6 illustrates a cross section of the amortisseur assembly and rotor slot of FIG. 5. In furtherance to FIG. 5, FIG. 6 shows the slot spring 142 under the slot amortisseur 150, with the stop block 177 abutting both the end of the slot amortisseur 150 and the end of the slot spring 142. In this illustrated embodiment, the thickness of the stop block 177 is between that of the slot amortisseur 150 and the combined thickness of the slot amortisseur 150 plus the slot spring 142, when the slot spring 142 is in the compressed state with one or more slot wedges (not shown in FIG. 6) wedged between the slot amortisseur 150 and the dove-tail portion 108 of the rotor slot 100.

According to one embodiment, a method of manufacturing and/or installing an amortisseur assembly in a rotor 10 is provided. In some embodiments, the amortisseur assembly can be manufactured from stock materials and installed, while in other embodiments, an existing amortisseur assembly can be modified and installed. When an existing amortisseur assembly is modified, or when an amortisseur assembly is newly manufactured from stock materials for installation onto an existing rotor, an existing amortisseur assembly might be disassembled from the existing rotor as necessary or as appropriate.

According to one embodiment of the method, slot springs 141, 142 are provided. Regardless whether the amortisseur assembly is manufactured using stock materials or the amortisseur assembly is modified from an existing amortisseur assembly, the slot springs 141, 142 are manufactured from stock materials using known techniques. Existing slot springs are typically about 9 inches long. As described previously, these 9 inch long slot springs primarily provide a force exerted radially outward to push the slot amortisseurs against the slot wedges 170. The slot springs 141, 142 are manufactured longer in order to improve friction and reduce manufacturing tolerances that stack for each spring in a slot 100. Each of these aspects of improvement achieved with the longer slot springs 141, 142 facilitates the reduction or prevention of migration or slippage of the slot springs 141, 142 and/or the slot amortisseurs 150 in the rotor slots 100. In the exemplary embodiment, the slot springs 141, 142 are manufactured at a length between about 20-24 inches (≈50.8-60.96 centimeters). It is conceived that the slot springs 141, 142 could be manufactured longer, up to the full length of the slot amortisseur 150, in order to achieve even greater friction and lesser manufacturing tolerance stacking, to thereby even further reduce or prevent slippage of the slot springs 141, 142, and/or the slot amortisseurs 150. When modifying an existing amortisseur assembly, the existing slot springs are replaced with the longer, newly manufactured slot springs 141, 142. The slot springs 141, 142 are manufactured so that the cumulative length of the middle slot springs 141 plus the end slot springs 142 leaves minimal or no spacing between the slot springs 141, 142 and the stop block 177. The fit achieved is tighter, with less spacing, than the prior art.

According to one embodiment of the method, the slot springs 141, 142 are installed in the rotor slot 100. The middle slot springs 141 are installed serially in the rotor slot 100 between the two end slot springs 142. The slot springs 141, 142 are inserted above the rotor winding 120, and/or the creepage blocks 130, and/or the outer shoulder 106, so that the vent holes in each rotor component align to form an unrestricted radial vent path 109.

According to one embodiment of the method, at least one slot amortisseur 150 is provided. The slot amortisseur 150 can be manufactured from stock material or an existing slot amortisseur can be shortened in order to accommodate space in the rotor slot 100 for a stop block 177 on either end of the slot amortisseur 150. In the exemplary embodiment, the stop blocks 177 are approximately 1.500 inches long and the rotor slot 100 is approximately 165.000 inches (≈419.10 centimeters) long, so the slot amortisseur 150 can be manufactured from stock material at approximately 162.000 inches (≈411.48 centimeters) long, or an existing slot amortisseur, which is as long as the rotor slot 100, can be cut on each end to be shortened to approximately 162.000 (≈411.48 centimeters) inches long. In the latter case, the existing slot amortisseur must be cut approximately equally on each end to maintain symmetry of the vent holes. The length of the slot amortisseur 150 is manufactured or modified in order to provide minimal or no spacing between the slot amortisseur 150 and the stop blocks 177. The fit achieved leaves minimal or no spacing, and minimal or no room for migration or longitudinal slippage of the slot amortisseur 150 and/or the slot springs 141, 142.

According to one embodiment of the method, the slot amortisseur 150 is installed in the rotor slot on top of the slot springs 141, 142. The vent holes in the slot amortisseur 150 are aligned with the vent holes in the slot springs 141, 142, and the ends of the slot amortisseur 150 can be approximately aligned with the ends of the end slot springs 142. A space is defined between each end of the slot amortisseur 150 and each respective end of the rotor slot 100. The space can be approximately equal on each end of the slot amortisseur 100, meaning each end of the slot amortisseur 100 can be approximately equidistant from the nearest end of the rotor slot 100. The length of this space (i.e. the length by which the slot amortisseur 100 is short of the rotor slot 100 on one end) is approximately equal to the length of the stop block 177.

According to one embodiment of the method, slot wedges 160 can be installed in the rotor slot 100 on top of the slot amortisseur 150. The slot wedges 160 are wedged serially into the rotor slot between the amortisseur 150 and the dove-tail portion 108 of the rotor slot 100. The vent holes in the slot wedges 160 are aligned with the vent holes in the slot amortisseur 150 and the vent holes in the slot springs 141, 142. The slot wedges 160 extend longitudinally as far as the dove-tail portion extends, which is less than the full length of the rotor slot 100, and less than the full length of the slot amortisseur 150.

According to one embodiment of the method, the end winding amortisseur 170 with stop blocks is provided. The end winding amortisseur 170 can be manufactured from stock material or an existing end winding amortisseur 170 can be modified in order to attach the stop block 177 to the radially inner side 171 of the base of each finger element 175. The stop block has a length from the longitudinally inner end 173 of the end winding amortisseur (or the end of the rotor slot 100) approximately equal to the distance by which the slot amortisseur 150 is short from the longitudinally inner end 173 of the end winding amortisseur (or the end of the rotor slot 100). In the exemplary embodiment, the stop blocks 177 extend approximately 1.500 inches (≈3.81 centimeters) from the longitudinally inner end 173 of the end winding amortisseur in order to accommodate a rotor slot length of approximately 165.000 inches (≈419.10 centimeters) long and a slot amortisseur length of approximately 162.000 (≈411.48 centimeters) inches long. With varying rotor slot lengths and/or slot amortisseur lengths, the stop block length can also vary. The stop block 177 can be formed as an integral part of the end winding amortisseur 170, or the stop block 177 can be attached or fastened to the end winding amortisseur 170, for example by welding, gluing, or another known fastening method. The length of the stop block 177 is set to provide minimal or no spacing between the slot amortisseur 150 and the stop blocks 177, and between the slot springs 141, 142 and the stop blocks 177. The fit of the slot amortisseur 150 and the slot springs 141, 142 in the rotor slot 100 is tighter, with less longitudinal spacing, than in the prior art, thereby reducing migration or slippage of the slot amortisseur 150 and the slot springs 141, 142.

According to one embodiment of the method, the end winding amortisseur 170 is installed on an end of the rotor body 11. Each finger element 175 extends longitudinally into a portion of a rotor slot 100 where the dove-tail portion 108 and the slot wedges 160 are absent. Each finger element 175 extends over the slot amortisseur 150 in the respective rotor slot 100 and contacts the respective slot amortisseur 150 so that electrical energy can be carried between each contacted slot amortisseur 150 and the end winding amortisseur 170. Each stop block 177 abuts against the end of a slot amortisseur 150 and/or against the end of an end slot spring 142, leaving minimal or no space longitudinally between the stop blocks 177 and the slot springs 141, 142, and/or between the stop blocks 177 and the slot amortisseurs 150.

The term "approximately" used herein with reference to physical distances means, in some cases, less than 0.100 inches (≈0.254 centimeters); in some cases it means less than 0.050 inches (≈0.127 centimeters); in some cases it means less than 0.025 inches (≈0.064 centimeters); in some cases it means less than 0.010 inches (≈0.025 centimeters); in some cases it means less than 0.005 inches (≈0.013 centimeters); in some cases, it means 0.001 inches (≈0.003 centimeters); and in some cases it means 0 inches.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An amortisseur assembly for a rotor assembly, the amortisseur assembly comprising:
    at least one end winding amortisseur,
    wherein each end winding amortisseur comprises an annular body with a first edge and at least one finger element extending from the first edge, each finger element having a first surface facing radially inwardly with respect to the annular body, at least one of the at least one finger element comprising a stop block on the first surface.

2. The amortisseur assembly as recited in claim 1, wherein the stop block further comprises an edge farthest from the first edge of the annular body, the edge being substantially straight.

3. The amortisseur assembly as recited in claim 1, wherein the stop block is welded to the finger element.

4. The amortisseur assembly as recited in claim 1, wherein the amortissuer assembly further comprises at least one slot amortisseur, each finger element extending over a respective one of the slot amortisseurs, each stop block abutting an end of a respective one of the slot amortisseurs.

5. The amortisseur assembly recited in claim 4, wherein the stop block has a thickness greater than the thickness of the slot amortisseur.

6. The amortisseur assembly recited in claim 5, wherein the amortisseur assembly further comprises at least one slot spring, and wherein the stop block has a thickness no greater than the thickness of the slot amortisseur plus a thickness of the slot spring in a compressed state.

7. A rotor assembly comprising:
    a rotor comprising a rotor body, the rotor body further comprising a rotor body first end, a rotor body second end, and at least one rotor slot extending longitudinally across at least a portion of the rotor body between the rotor body first end and the rotor body second end;
    at least one annular end winding amortisseur positioned on at least one of the rotor body first end and the rotor body second end; and
    at least one slot amortisseur positioned in the at least one rotor slot,
    wherein the end winding amortisseur comprises a first edge with at least one finger element extending from the edge, each finger element extending over and mating with a respective one of the slot amortisseurs, at least one of the finger elements comprising a stop block, each stop block abutting an end of a respective one of the slot amortisseurs.

8. The rotor assembly as recited in claim 7, wherein one stop block abuts each end of the slot amortisseur, with substantially no gaps between.

9. The rotor assembly as recited in claim 7, wherein the rotor assembly further comprises at least one slot spring positioned in the at least one rotor slot, and wherein each stop block abuts an end of a respective one of the slot springs.

10. The rotor assembly as recited in claim 9, wherein the at least one slot spring and the at least one slot amortisseur have vent holes that are aligned.

11. The rotor assembly as recited in claim 7, wherein the length of each slot amortisseur is less than the length of the rotor slot substantially by the length of the stop block.

12. The rotor assembly as recited in claim 9, wherein the length of each slot spring is less than the length of the rotor slot substantially by the length of the stop block.

13. A method of forming an amortisseur assembly for a rotor, the method comprising:
providing one or more slot amortisseurs; and
providing one or more end winding amortisseurs, the end winding amortisseurs each comprising an annular body with a first edge and at least one finger element extending from the first edge of the annular body, each finger element comprising a first surface facing radially inwardly with respect to the annular body, and each finger element comprising a stop block on the first surface of at least one of the at least one finger element.

14. The method as recited in claim 13, wherein the method further comprises:
installing at least one of the slot amortisseurs into a rotor slot; and
installing at least one of the end winding amortisseurs on the rotor so that the stop block abuts an end of the at least one slot amortisseur.

15. The method as recited in claim 14, wherein the stop block fits into the length of a space in the rotor slot unfilled by the at least one slot amortisseur.

16. The method as recited in claim 14, wherein the method further comprises installing at least one slot wedge in the rotor slot radially outward of the at least one slot amortisseur.

17. The method as recited in claim 13, wherein providing one or more slot amortisseurs comprises shortening existing slot amortisseurs a substantially equal amount on each end.

18. The method as recited in claim 13, wherein the method further comprises providing one or more slot springs.

19. The method as recited in claim 18, wherein the method further comprises:
installing at least one of the slot springs into a rotor slot;
installing at least one of the slot amortisseurs into the rotor slot; and
installing at least one of the end winding amortisseurs so that the stop block abuts an end of the at least one slot amortisseur and an end of the at least one slot spring.

20. The method as recited in claim 19, wherein the one or more slot springs replace one or more existing slot springs, and the one or more slot springs are longer than the existing slot springs.

* * * * *